United States Patent [19]

Beauchamp et al.

[11] 4,195,216
[45] Mar. 25, 1980

[54] PLASMA WELDING

[75] Inventors: Derek J. Beauchamp, Gloucestershire; Donald L. A. Weston, Bristol, both of England

[73] Assignee: Rolls-Royce Limited, London, England

[21] Appl. No.: 886,144

[22] Filed: Mar. 13, 1978

[30] Foreign Application Priority Data

Mar. 18, 1977 [GB] United Kingdom ............... 11642/77

[51] Int. Cl.² ............................................. B23K 9/10
[52] U.S. Cl. .......................... 219/121 P; 219/137.71; 219/137 R
[58] Field of Search ............. 219/121 P, 121 R, 137.7, 219/137.71, 137 R; 313/231.4

[56] References Cited
U.S. PATENT DOCUMENTS 2,152,785   4/1939   Blankenbuehler ................ 219/137.7
2,766,361  10/1956   Landis et al. ..................... 219/137.7
3,956,610   5/1976   Karbe et al. ...................... 219/137.7
4,023,006   5/1977   West et al. ........................ 219/121 P

FOREIGN PATENT DOCUMENTS 2811643  9/1978  Fed. Rep. of Germany ....... 219/121 P Primary Examiner—Elliot A. Goldberg
Assistant Examiner—M. H. Paschall
Attorney, Agent, or Firm—Stevens, Davis, Miller & Mosher

[57] ABSTRACT

In plasma welding apparatus controls are provided which regulate the rates of increasing and decreasing the welding parameters e.g., welding current, gas flow and wire feed to prevent the formations of craters in the weld at the end of a welding run. Improved welds are formed if the wire feed rate is increased prior to the start of the decrease in welding current but after the gas flow to the plasma arc has begun to decrease.

5 Claims, 3 Drawing Figures

PLASMA WELDING

This invention relates to improvements in plasma welding. In our United Kingdom Pat. No. 1,405,415 we described and claimed plasma arc welding apparatus suitable for controlling the establishment and subsequent reduction of the plasma forming gas flow and the arc welding current during a plasma welding operation. This apparatus is especially suitable for keyhole welding, enabling the production of a satisfactory weld, and was particularly suitable for welding around circular components in which the end of the weld overlapped the beginning of the weld.

The technique of keyhold welding refers to the piercing of the workpiece by the plasma arc and the subsequent melting of metal ahead of the arc which then flows, by surface tension, behind the arc where it subsequently solidifies. Such welding processes are now well established in the art, but the process continues to be extremely sensitive to the closure of the keyhole at the end of the weld. Difficulties are experienced in ensuring that the final part of the weld is free from a defect known as cratering in which an elongate concave depression, frequently accompanied by small cracks, is formed at the end of the weld.

The present invention provides an improvement in the apparatus and method of UK Pat. No. 1,405,415 which enables an operator to substantially avoid the formation of craters at the end of a weld and the disadvantages associated with them.

According to the present invention there is provided plasma welding apparatus comprising means for supplying a filler material from a store to the weld, a gas flow control valve for the plasma forming gas supply, an electrical supply for the plasma arc welding current, means for co-ordinating the relative changes in gas flow, arc current and the supply of filler material to the weld, and means operative to increase the rate of feed of filler material at the end of a weld relative to the rate of supply elsewhere during the weld.

Also according to the present invention there is provided a method of terminating a plasma welding operation comprising the steps of: initiating the conclusion of a welding run to close the keyhole formed during the welding run by the plasma arc piercing the workpiece, and subsequently increasing the rate of feed of filler material to the weld.

A particular embodiment of the invention will now be described by way of example only with reference to the accompanying drawings wherein.

Figure 1:
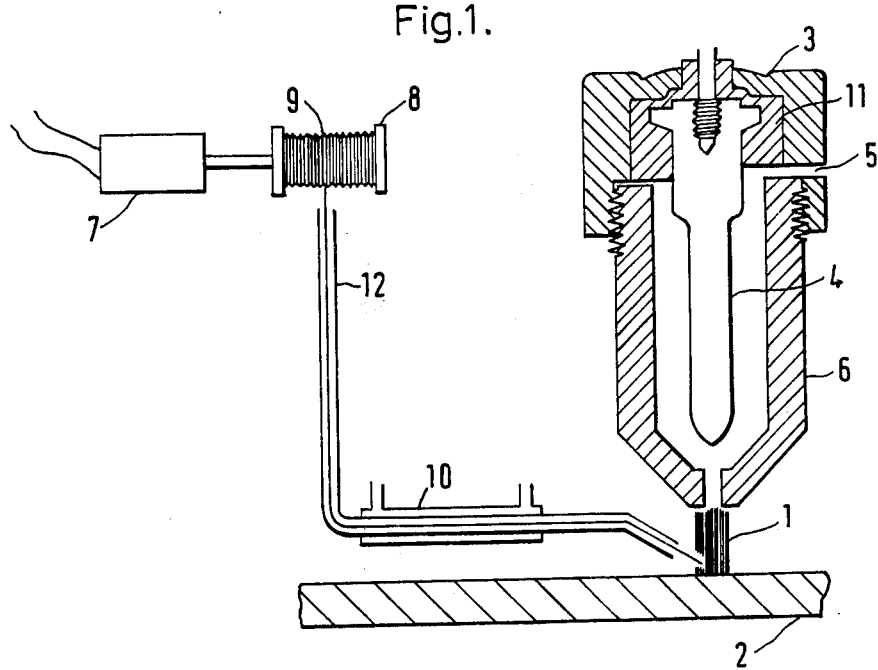
FIG. 1 is a schematic diagram of the layout of a plasma welding apparatus.

In FIG. 1 a plasma arc 1 is directed towards a workpiece 2 from the plasma welding nozzle 3 forming the plasma arc 1. The nozzle 3 comprises a central electrode 4, usually made of tungsten and isolated from the main body of the nozzle 3 by insulation 11, an inlet 5 for an inert gas usually argon, and a conical sheild 6 which restricts the width of the plasma arc 1.

A motor 7 drives a spool 8 round which is wound a store of filler material in wire form 9 suitable for the materials being welded. The wire is optionally cooled by a heat exchanger 10, water being a convenient exchange medium.

The welding process is protected by a local atmosphere of an inert gas to prevent oxidation.

The work 2 is traversed relative to the nozzle 3 and the wire feed attachment 12, alternatively the nozzle and the wire feed attachment can be moved along the desired weld line.

Figure 2:
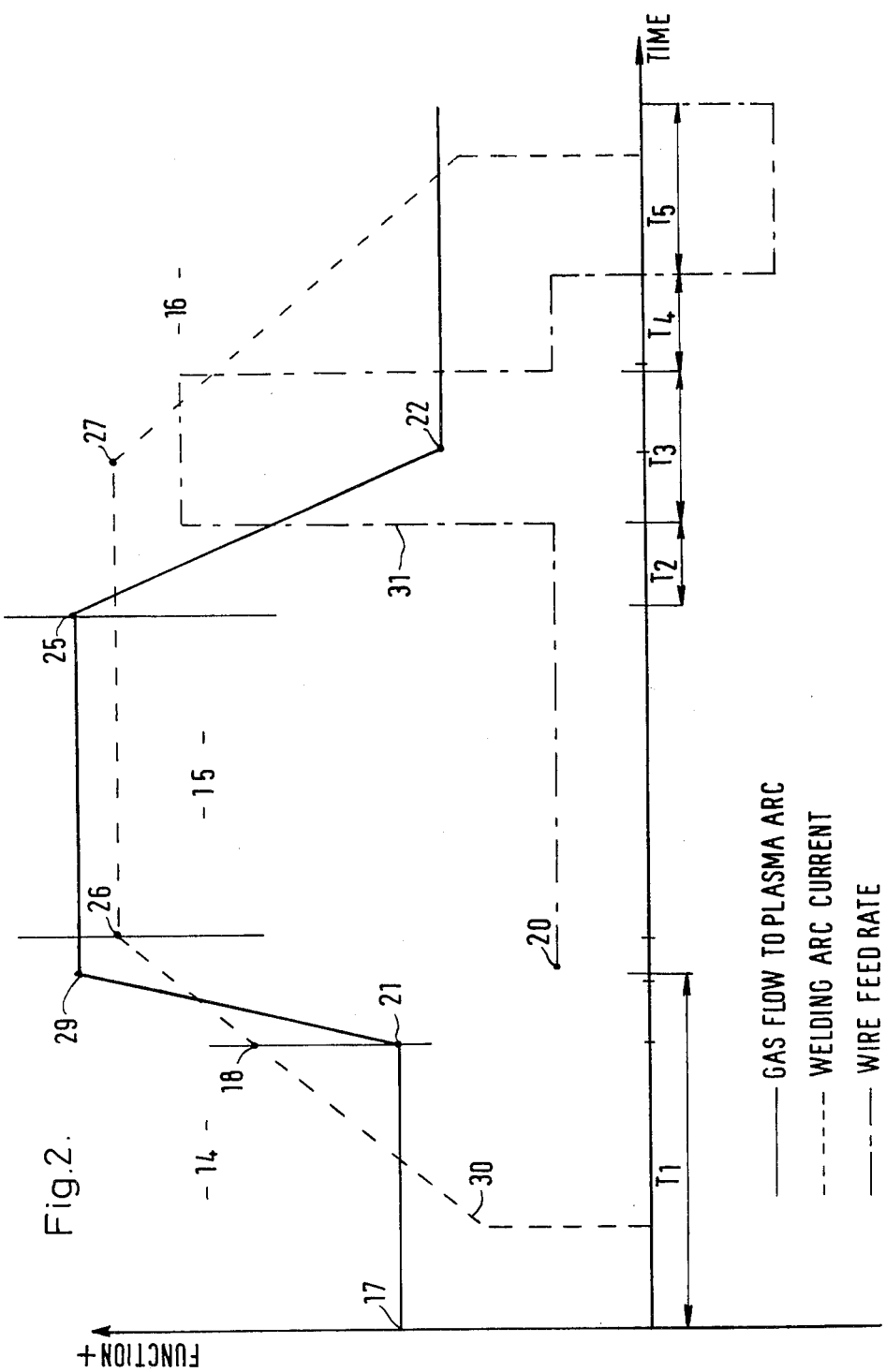
FIG. 2 shows a typical relationship, in accordance with the invention, between the rate of gas flow for the plasma arc, the current supplied to the torch and the filler material feed rate.

The graph of FIG. 2 shows a desired relationship between the rate of gas flow for the plasma arc, the welding current supplied to the torch and the wire feed rate which enables cratering of the weld to be avoided at the end of the welding operation. This desired relationship is produced using the apparatus later described with reference to FIG. 3.

The gas flow for the plasma arc is represented by the solid line 29 a suitable current flow is indicated by a hatched line 30 and the wire feed is shown as a chain dotted line 31.

The regions 14,16 are referred to as upslope and downslope respectively, region 15 represents the steady rate welding process.

An operator begins the welding cycle by starting the gas flow to the plasma arc, the initial value of which 17 is commonly set at 50% of the maximum value required during the welding operation. Thereafter the current upslope begins, the current increases at a substantially constant rate and when it reaches a predetermined value 18, the gas flow also begins to increase at a substantially constant rate until it reaches a maximum value at point 29.

The rate of increase of the gas flow rate is controlled by setting the time required for the gas flow rate to reach its maximum value and this is chosen according to the material to be welded and its physical dimensions.

In practice a time period of between 1 and 5 seconds is found to be suitable for increasing the gas flow to its steady value. As stated this defines the point 29. The point 29 may lie to the right or left of the point 26 at which the welding current has achieved its steady value.

Simultaneously, or shortly after the gas flow reaches its maximum value, the wire feed motor is switched on at time 20 and the wire feed continues at a constant rate for the duration of the steady state welding process—1-5—which continues until the downslope region 16. Point 18 represents the value of the welding current that corresponds to the establishing of a keyhole, i.e. where the plasma arc first pierces the workpiece. The current reaches its maximum value at 26 and remains at a steady value until point 27.

The parameters selected for the upslope region determine the characteristics of the lead in to the weld. The weld is not started at full welding current as this is found to cause a large mound of material to be left at the start position. To eliminate this mound it is desirable that the gas flow rate should exceed one cubic foot per hour to enable a stable arc to be established the traverse of the welding torch which is carried out at a steady rate throughout the process must begin before a large weld pool is formed and the commencement of the gas upslope should be delayed until the welding current has reached the welding level, i.e. the point 18 at which a keyhole is established. The welding current although illustrated as starting from zero can in practice be started at about 30% of its steady state value, indeed this is desirable to strike the arc. A high frequency current may be used to initiate the arc as in conventional welding processes.

As is conventional in plasma welding the work, the torch and the underneath of the work are shielded by an inert gas such as argon. The source of this inert gas and the shielding are not shown.

This shielding is applied before welding commences so as to purge the local atmosphere, and is continued after the welding process has stopped until the temperature of the work has dropped sufficiently to prevent oxidation of the weld and other undesirable interactions between the metal and atmospheric gases.

At the conclusion of the welding run, referred to as the downslope region 16, the operator, or a suitable timing device (not shown), initiates the reduction in gas flow at time 25. A final value for the gas flow of some 30% of the maximum gas flow rate is chosen, together with the time taken for it to reach this value. Prior to the time 27 when the gas flow rate has been reduced to less than half its maximum at point 22 the current begins to decrease.

A small decrease in welding current of the order of 10% is permissible before the gas flow rate has decreased to its minimum value.

The current is illustrated in FIG. 2 as falling steadily away to zero, this may be possible but conventional welding power supplies will generally not continue to operate below a certain current; however, it is not detrimental to the execution of the weld if the welding current is not reduced to zero but it is important that the welding current is reduced to below about 25% of its steady value.

It has been found that by maintaining the welding current at its steady level and reducing the gas flow rate and adjusting the wire feed rate the fluidity of the weld bead may be maintained and the keyhole neatly closed. The wire feed rate is continued at its steady level for an interval T2 after the initiation of the reduction of the gas flow and is subsequently increased for a further time interval T3 which straddles the time 27 at which the arc welding current begins to reduce. This increase in wire feed rate makes available further filler material to the weld thus reducing the tendency to form a crater on shrinkage of the molten weld pool and assists in withdrawing heat from the weld pool to ensure its progressive solidification at a steady rate. Following the period T3 of increased wire feed it is reduced to its previous level T4 for a short duration and then the wire feed motor is reversed for a period T5 so that the wire is withdrawn from the weld pool thus preventing it sticking in the rapidly cooling metal. Downslope rates for both current and gas flow are selected which are slow enough to prevent cracking of the weld due to rapid shrinkage of the weld pool.

The gas downslope rate must be fast enough to prevent gas being trapped beneath the weld pool.

The final gas flow rate should be reduced to the level of less than 0.75 cubic feet per hour in order to reduce the force of the plasma jet, but a sufficient flow should remain to substain an arc. A typical set of values used in executing a circumferential plasma butt weld according to the invention in the high temperature resistant nickel alloy Waspaloy (Registered Trade Mark) are:

Weld executed in 12 gauge Waspaloy (Registered Trade Mark)

| | |
|---|---|
| Plasma Welding Nozzle size | 1/16 inch |
| Plasma Arc Voltage | 29 volts |
| Plasma Arc Welding Current | |
| Starting | 22 amperes |
| Welding | 62 amperes |
| Final | 25 amperes |
| Time from Starting to Welding Value | 5 seconds |
| Time from Welding to Final Value | 6 seconds, current downslope, begins at time corresponding to 0.9 cubic feet per hour gas flow rate |
| Gas Flow Rate | |
| Starting | 0.3 cubic feet per hour, gas upslope begins at time corresponding to current of 60 amperes |
| Steady | 1.4 cubic feet per hour |
| Final | 0.1 cubic feet per hour |
| Time from Starting to Steady value | 3 second |
| Time from Steady to Final Value | 3 second |
| Welding Traversing Speed | 10 inches/minute |
| Wire Feed rate 20 gauge wire from end of | $T_1$ = 12 inches/minute |
| Downslope delay during | $T_2$ = not applicable in this example |
| Crater Fill during | $T_3$ = 100 inches/minute |
| Weld level during | $T_4$ = not aplicable in this example |
| Reverse during | $T_5$ = −15 inches/minute |
| Time Periods | |
| Start delay | $T_1$ = 5.0 second |
| Downslope delay | $T_2$ = 0.0 second |
| Crater Fill | $T_3$ = 1.5 second |
| Weld Level | $T_4$ = 0.0 second |
| Reverse | $T_5$ = 2.0 second |

Figure 3:
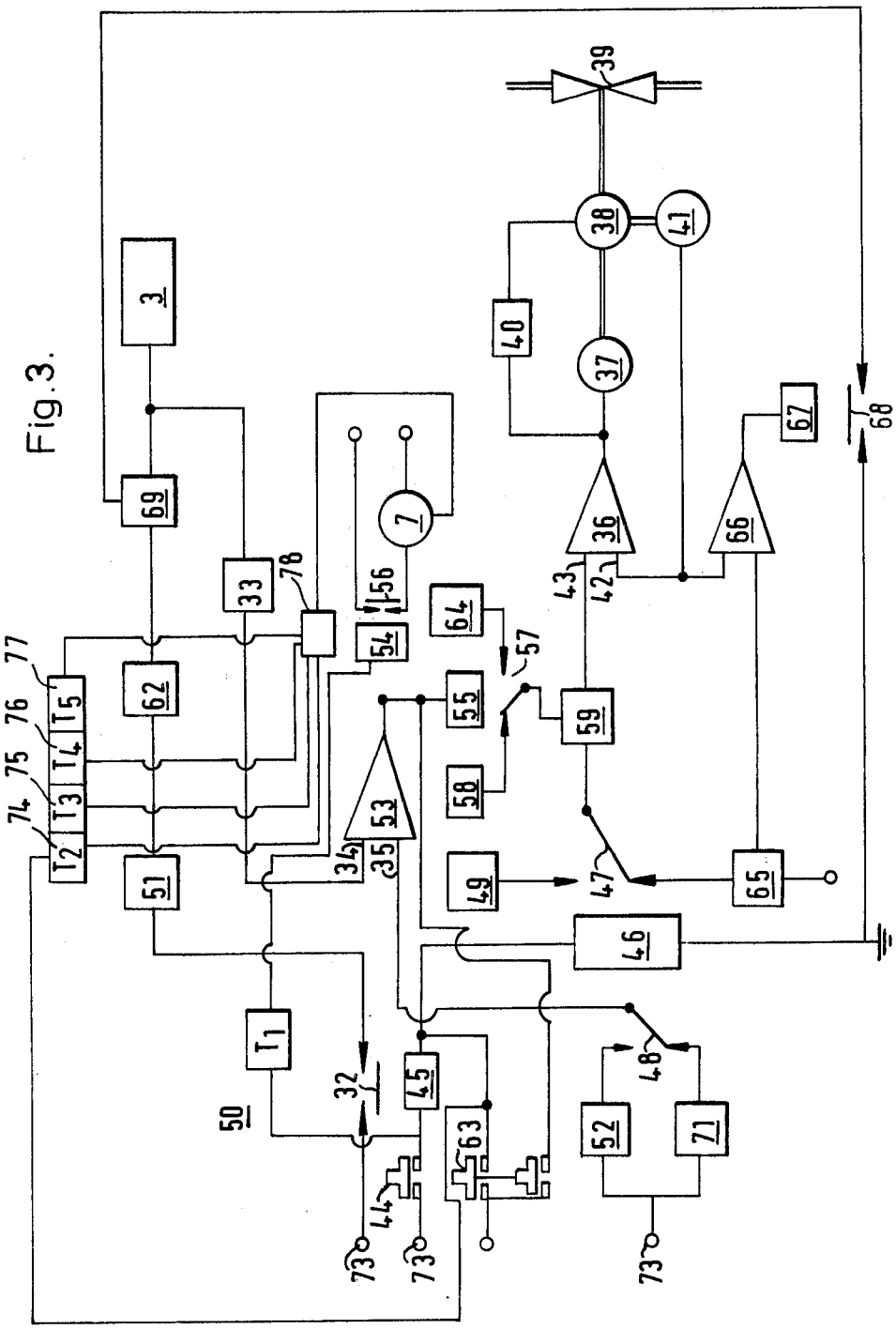
FIG. 3 is a block diagram of an apparatus suitable for producing the relationship of the graph of FIG. 2.

The control of the welding process illustrated in FIG. 2 is achieved using the apparatus shown in block form in FIG. 3.

The regulation of the gas flow is controlled by a servo amplifier 36 the output of which powers an electric motor 37 which via a gearbox 38 varies the gas flow rate through a valve 39.

In this way the amplifier 36 subtracts the actual position of the valve 39 from the desired position which is represented by the signal at the non-inverting input 43 and the resulting output from the amplifier 36 is the signal to the motor 37 to adjust the position of the valve 39. In order to prevent the motor over-running it is damped by a feedback 40 from the gearbox 38.

The operating signal to the amplifier 36 is derived from a series of interconnected circuits.

A welding run is begun by an operator pressing the start button 44. This connects a relay 45 which energises a second relay 46 to close two pairs of contacts 47, 38. The first pair of contacts 47 switches in the apparatus in block 49 to send a signal to the servo amplifier 36 which via the motor 37 and the gearbox 38 starts the gas flow at a rate dictated by said signal. This is a preset value chosen by the operator having regard to the physical characteristics of the material to be welded and is commonly chosen to be 50% of the maximum gas flow rate required during the welding process.

Relay 45 also operates switch 32 to initiate the electrical supply to the plasma torch 3. The strength of the plasma arc current is increased at a constant predetermined rate from the value necessary to ensure a steady strike of the plasma welding arc. This may be an inbuilt function of the plasma welding power supply or it may be a separate unit within this device. It is illustrated as block 51. The apparatus in blocks 62 and 69 has no effect on the initial current supply to the torch 3, and its significance will be explained later. The second pair of contacts 48 connects a reference voltage derived from the electronics of block 52 (which is referred to as the upslope current trip) to one terminal 35 of a switching amplifier 53.

When the arc current reaches a predetermined strength as sensed by the electronics of block 33 (point 18 of FIG. 1) the signal appearing at terminal 34 of the switching amplifier 53 equals the reference voltage at terminal 35 and the switching amplifier energises relay 55.

Pressing the start button 44 also brings into effect timer $T_1$; at the end of time period $T_1$ relay 54 connects terminals 56 to bring the wire feed motor 7 into operation. The wire feed rate can be varied and suitable values are chosen by the operator before starting the welding run, as will later be described.

Relay 55 switches the contacts 57 to bring the gas flow upslope rate, block 58, into operation. The rate of gas flow will now steadily increase until it reaches the maximum value, set in terms of the maximum output from block 59 to terminal 43 of the amplifier 36. Block 59 provides the maximum limit for the gas flow rate and may be preset before commencing the welding run.

The electronics in block 58 is designed so that the time for the gas flow rate to increase from the value set by block 49 (the starting gas flow) to the maximum rate determined by block 59 can be chosen. This determines the slope of the line between points 21 and 29 of FIG. 2.

The maximum plasma arc current is limited by the apparatus in block 62 and this may be a feature of the plasma arc welding supply or another unit within this device.

The welding proceeds with the values of the wire feed, gas flow and arc current at steady values until at point 25 the operator decides to terminate the welding run, which is done by pressing the downslope button 63, alternatively a time switch (not shown) may be used to initiate the downslope.

Pressing the downslope button cuts off the current to relays 46 and 55 and at the same time brings into operation, four interconnected timer circuits 74, 75 76 and 77 all of which are connected to vary, at the end of given selected times $T_2$, $T_3$, $T_4$ and $T_5$; the speed control apparatus 78 of wire feed motor 7 as will be explained later in this specification. Contacts 47, 48 and 57 change over and the gas flow rate starts to decrease, the rate of decrease is controlled by block 64. The time for the gas flow rate to change from the maximum flow rate to the final gas flow rate, can be altered to vary the slope of the line 25,22 of FIG. 2.

The feedback from the potentiometer 41 is compared with the signal from block 65, representing the final gas flow rate, by the switching amplifier 66.

When the two values are equal the switching amplifier 66 energises relay 67. This closes contacts 68 and sends an instruction to block 69 to start the current downslope. The current decreases at a predetermined rate which may, once more, be a function of the plasma welding power supply or of the unit. When the current has decreased to a value such that the voltage at terminal 34 of the switching amplifier equals the new reference voltage set at 35 by block 71, which is the downslope current trip, current to the torch switches off.

After pressing downslope button 63, wire feed continues at constant speed until the end of time period $T_2$ as dictated by timer 74, between the start of gas flow downslope and current downslope, when a sudden increase in feed rate is introduced and is continued at a further constant rate for time period $T_3$ dictated by timer 75 until after the gas flow rate reaches its minimum value, whereupon the wire feed rate is caused to revert to its original feed rate for time $T_4$ controlled by timer 76 and at the end of that time, motor 7 is reversed and for a time period $T_5$ controlled by timer 76, wire is withdrawn at a slower feed rate than hitherto, which time period overlaps the cessation of current supply to the welding torch. Thereafter, the machine is switched off for substitution or workpieces.

The equipment can be fitted with a reset button (not shown) to make the apparatus ready for a second run. The reset button would return all two way switches to a null position (i.e. not contacting either of the two output connections of the switches) and also to disconnect all one way switches.

The traverse of the workpiece below the plasma arc may be controlled manually or by switches built in to the apparatus of FIG. 3. For example, the traverse may be initiated by the switch 44 and terminated by a time switch set to switch off at a suitable time interval (10 seconds) after the end of the welding process this time interval is not critical.

Appropriate power supplies are applied to the apparatus of FIG. 3 via terminals 73.

It will be appreciated that, while the regulation of the gas flow has been described in terms of correlation with the plasma arc welding current; once the interelationship between the current and gas flows has been understood it would be quite possible to regulate the current in terms of the gas flow at a given time.

Indeed once the time intervals and slopes are known, it is possible to regulate any one parameter of the invention by correlating it with any other parameter.

For welding very thick materials, it is not practicable to use the keyhole technique and several welding runs require to be made by the process known as overlap welding. This process may also be carried out using the apparatus described in the invention using the techniques herein described with respect to the upslope and downslope regions.

We claim:

1. A method of terminating a plasma welding operation comprising the steps of: initiating the conclusion of a welding run to close the keyhole formed during the welding run by the plasma arc piercing the workpiece, and subsequently increasing the rate of feed of filler material to the weld.

2. A method of terminating a plasma welding operation according to claim 1 and comprising the further steps of: waiting for a predetermined time following increase of the rate of feed of filler material to the weld and subsequently reducing the rate of feed of filler material to the weld at least to the rate of feed prevailing elsewhere during the weld.

3. A method of terminating a plasma welding run according to claim 2 and comprising the further step of continuing said reduced rate of feed of filler material to the weld for a predetermined time.

4. A method according to claim 1 and comprising the further step of reversing the direction of feed of filler material to the weld.

5. A method according to claim 3 and comprising the further step of reversing the direction of feed of filler material to the weld at the end of said predetermined time.

* * * * *